(12) United States Patent
Hozumi et al.

(10) Patent No.: US 9,457,690 B2
(45) Date of Patent: Oct. 4, 2016

(54) SEAT APPARATUS FOR VEHICLE (71) Applicant: Aisin Seiki Kabushiki Kaisha, Kariya-shi (JP)

(72) Inventors: Soichiro Hozumi, Nishio (JP); Hitoshi Tsuzuki, Kariya (JP); Toshihiro Sugiyama, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 57 days.

(21) Appl. No.: 14/533,260

(22) Filed: Nov. 5, 2014

(65) Prior Publication Data
US 2015/0130240 A1 May 14, 2015

(30) Foreign Application Priority Data

Nov. 8, 2013 (JP) .................................. 2013-231749

(51) Int. Cl.
| G05B 5/00 | (2006.01) |
| B60N 2/04 | (2006.01) |
| B60N 2/02 | (2006.01) |
| B60N 2/12 | (2006.01) |
| B60N 2/16 | (2006.01) |
| B60N 2/06 | (2006.01) |
| B60N 2/22 | (2006.01) |

(52) U.S. Cl.
CPC ................ *B60N 2/04* (2013.01); *B60N 2/0244* (2013.01); *B60N 2/06* (2013.01); *B60N 2/12* (2013.01); *B60N 2/16* (2013.01); *B60N 2/1615* (2013.01); *B60N 2/22* (2013.01)

(58) Field of Classification Search
CPC ........ B62D 1/181; B60R 1/07; B60N 2/0248
See application file for complete search history.

(56) References Cited

U.S. PATENT DOCUMENTS

| 8,038,217 B2 | 10/2011 | Yamagishi et al. |
| 2011/0043018 A1 | 2/2011 | Maeda et al. |
| 2012/0133184 A1* | 5/2012 | Himmelhuber .......... B60N 2/50 297/338 |

FOREIGN PATENT DOCUMENTS

| DE | 297 00 293 U1 | 2/1997 |
| EP | 2 000 351 A1 | 12/2008 |

(Continued)

OTHER PUBLICATIONS

Extended Search Report issued Mar. 11, 2015 in European Patent Application No. 14191998.5.

*Primary Examiner* — Karen Masih
(74) *Attorney, Agent, or Firm* — Oblon, McClelland, Maier & Neustadt, L.L.P.

(57) ABSTRACT

A seat apparatus for a vehicle includes a first adjustment portion which adjusts a position of a vehicle seat in a front/rear direction, a second adjustment portion which adjusts a position of the vehicle seat in an up/down direction, a third adjustment portion which adjusts a tilt angle of a seatback, and an operation input portion which is operated for performing a forward movement of the vehicle seat and a forward tilting operation of the seatback in an associated manner with each other, the forward movement of the vehicle seat being performed by the first adjustment portion and the forward tilting operation of the seatback being performed by the third adjustment portion, wherein the second adjustment portion starts performing a downward movement of the vehicle seat before the forward tilting operation of the seatback is performed after the operation of the operation input portion.

4 Claims, 3 Drawing Sheets (56) References Cited

FOREIGN PATENT DOCUMENTS

| EP | 2 287 035 A2 | 2/2011 |
| JP | 58-76334 | 5/1983 |
| JP | 2009-202666 | 9/2009 |
| JP | 2012-158301 | 8/2012 |
| JP | 5104853 | 12/2012 |

\* cited by examiner

Prior Art

SEAT APPARATUS FOR VEHICLE

CROSS REFERENCE TO RELATED APPLICATIONS

This application is based on and claims priority under 35 U.S.C. §119 to Japanese Patent Application 2013-231749, filed on Nov. 8, 2013, the entire content of which is incorporated herein by reference.

TECHNICAL FIELD

This disclosure generally relates to a seat apparatus for a vehicle.

BACKGROUND DISCUSSION

Generally, a known seat apparatus for a vehicle includes a seat slide function for adjusting a position of a vehicle seat in a front/rear direction and a seat reclining function for adjusting a tilt angle of a seatback. Some of such known seat apparatuses include a so-called walk-in function, in which an operation of moving the vehicle seat in the front direction and an operation of tilting the seatback forward are performed in association with each other so that an ease of ingress to and egress from a rear seat which is provided at a rear side relative to the vehicle seat is enhanced (for example, refer to JP5104853B, which will be hereinafter referred to as Patent reference 1).

In addition, some of such known seat apparatuses include a seat lift function (or a seat tilt function) for adjusting a position of the vehicle seat in an up/down direction. As a result, degrees of freedom of the positional adjustment of the vehicle seat are even more enhanced (for example, refer to JP2012-158301A, which will be hereinafter referred to as Patent reference 2).

Figure 6:
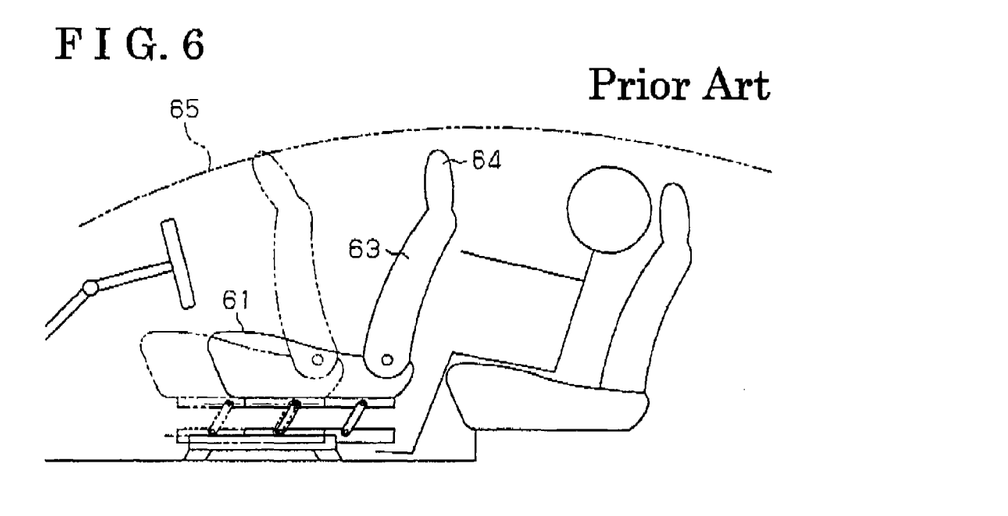
FIG. 6 is an explanatory diagram illustrating interference between the seat and a roof of a vehicle, which occurs at the walk-in operation of prior art.

However, with the enhancement of the degrees of freedom of the positional adjustment of the vehicle seat, a possibility of interference between an upper end part of a vehicle seat 61 (an upper end portion of a head rest 64) and a roof 65 of the vehicle with each other also increases at the above-described walk-in operation as illustrated in FIG. 6. That is, a front portion of the roof 65 of the vehicle is positioned lower than a central portion of the roof 65 in many cases. Accordingly, depending on a position at which the vehicle seat 61 is adjusted, an amount of moving the vehicle seat 61 forward and an amount of tilting a seatback 63 forward, both of which constitute the walk-in operation, may not be assured sufficiently because of the interference between the upper end part of the vehicle seat and the roof. Therefore, there remains room for improvement in this aspect.

A need thus exists for a seat apparatus for a vehicle, which is not susceptible to the drawback mentioned above.

SUMMARY

According to an aspect of this disclosure, a seat apparatus for a vehicle includes a first adjustment portion which adjusts a position of a vehicle seat in a front/rear direction, a second adjustment portion which adjusts a position of the vehicle seat in an up/down direction, a third adjustment portion which adjusts a tilt angle of a seatback relative to the vehicle seat, and an operation input portion which is operated for performing a forward movement of the vehicle seat and a forward tilting operation of the seatback in an associated manner with each other, the forward movement of the vehicle seat being performed by the first adjustment portion and the forward tilting operation of the seatback being performed by the third adjustment portion, wherein the second adjustment portion starts performing a downward movement of the vehicle seat before the forward tilting operation of the seatback is performed after the operation of the operation input portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
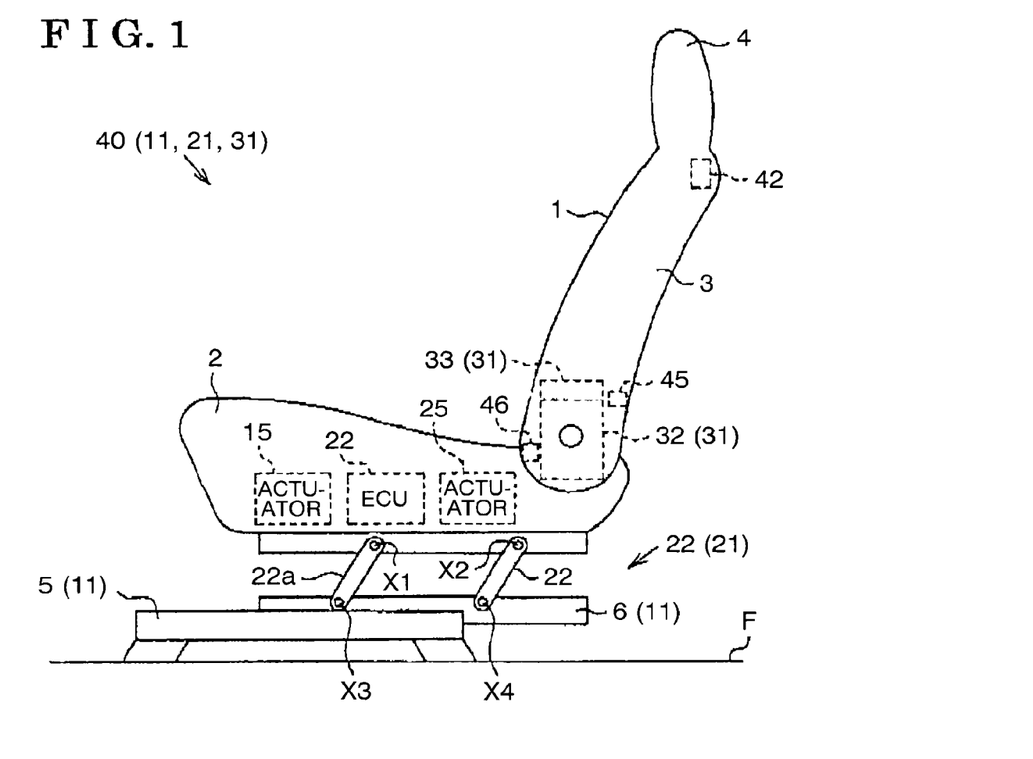
FIG. 1 is a block diagram schematically illustrating a seat apparatus according to an embodiment disclosed here.

An embodiment of a seat apparatus for a vehicle will be described with reference to the accompanying drawings. As illustrated in FIG. 1, a seat 1 for a vehicle (i.e., a vehicle seat) includes a seat cushion 2 and a seatback 3 which is provided at a rear end portion of the seat cushion 2 to be tiltable relative to the rear end portion the seat cushion 2. A head rest 4 is provided at an upper edge of the seatback 3.

In the present embodiment, a pair of lower rails 5 is provided at a floor portion F of the vehicle so that the lower rails 5 are arranged at left and right, respectively. Each of the lower rails 5 is formed to be extended in a vehicle front/rear direction (i.e., a front/rear direction). An upper rail 6 is mounted on each of the lower rails 5 in a manner that the upper rail 6 is movable on the corresponding lower rail 5 relative to the lower rail 5. The seat cushion 2 is supported on each of the upper rails 6.

That is, in the present embodiment, a seat slide apparatus 11 is constituted by the lower rails 5 and the upper rails 6 which are provided to be movable relative to each other. A user can use a function of the seat slide apparatus 11 to conduct a positional adjustment of the seat 1 in the vehicle front/rear direction (that is a left/right direction in FIG. 1).

Specifically, the seat slide apparatus 11 of the present embodiment is configured as a power seat slide apparatus at which the upper rails 6 are moved in the front/rear direction by an actuator 15 provided at an inside (at a lower portion) of the seat cushion 2. According to the actuator 15 of the present embodiment, a motor serving as a drive source of the actuator 15 is rotated by a driving power supplied by a seat ECU 20 which is provided at the inside of the seat cushion 2. The seat ECU 20 is configured to control the rotations of the motor, that is, the operation of the actuator 15, through the supply of the driving power.

In the present embodiment, a seat lift apparatus 21 is arranged between each of the upper rails 6, which constitutes the seat slide apparatus 11 as described above, and the seat 1. The user can use a function of the seat lift apparatus 21 to conduct a positional adjustment of the seat 1 in an up/down direction (that is, a height adjustment of the seat cushion 2).

Specifically, the seat lift apparatus 21 of the present embodiment is provided with a link mechanism (a parallel linkage) 22, which may be a known link mechanism, including link members 22a, 22b each of which is rotatably connected to the seat cushion 2 (a frame of the seat cushion 2) and to the corresponding upper rail 6. The link members 22a, 22b are provided as a pair in such a manner that the link member 22a is arranged at a front side relative to the link member 22b in the vehicle front/rear direction. More specifically, according to the present embodiment, the link members 22a, 22b of the link mechanism 22 are connected to the seat cushion 2 at connecting points X1, X2, respectively. In addition, the link members 22a, 22b of the link mechanism 22 are connected to the corresponding upper rail 6 at connecting points X3, X4, respectively. The connecting points X1, X2 are positioned at a vehicle rear side (that is, at the right side in FIG. 1) relative to the connecting points X3, X4. The seat lift apparatus 21 of the present embodiment is configured to raise and to lower the seat 1 (the seat cushion 2) which is supported above the seat lift apparatus 21, in accordance with the movement of the link mechanism 22.

That is, each of the link members 22a and 22b which constitutes the link mechanism 22 rotates relative to the seat cushion 2 and relative to the corresponding upper rail 6, and thus the seat cushion 2 supported on the link mechanism 22 is moved upwardly and downwardly. Specifically, the link members 22a, 22b rotate in the counterclockwise direction in FIG. 1 around the respective connecting points X3, X4, each of which is provided at the upper rail 6 and serves as a rotational center. Accordingly, the seat cushion 2 supported on the link mechanism 22 moves upwardly while moving forward. In a case where each of the link members 22a, 22b rotates in the clockwise direction in FIG. 1, the seat cushion 2 supported on the link mechanism 22 moves downwardly while moving rearward.

In a similar manner to the seat slide apparatus 11, the seat lift apparatus 21 of the present embodiment is configured as a power seat lift apparatus at which the link mechanism 22 is actuated by an actuator 25 provided at the inside (the lower portion) of the seat cushion 2. Operation of the actuator 25 is controlled on the basis of the driving power supplied by the seat ECU 20.

Further, the seat 1 of the present embodiment includes a seat reclining apparatus 31 which is adjusts a tilt angle of the seatback 3 of the seat 1 relative to the seat cushion 2 of the seat 1. In the present embodiment, the seat reclining apparatus 31 is configured as a power seat reclining apparatus including a motor serving as a drive source. The seat reclining apparatus 31 of the present embodiment is configured by the motor serving as the drive source, a speed reducer and a recliner 32, which are integrally provided at the seat reclining apparatus 31.

In addition, the seat reclining apparatus 31 of the present embodiment includes a largely-tilting mechanism 33 which is configured to release connection between the seat cushion 2 and the seatback 3 relative to each other via the recliner 32. By using a function of the largely-tilting mechanism 33, the user can make a large change to the tilt angle of the seatback 3 quickly with a manual operation.

Next, a walk-in function implemented in the seat apparatus of the present embodiment will be described. In the present embodiment, a seat apparatus 40 is constituted by the seat slide apparatus 11 (i.e., a first adjustment portion), the seat lift apparatus 21 (i.e., a second adjustment portion) and the seat reclining apparatus 31 (i.e., a third adjustment portion). The seat apparatus 40 adjusts the position of the seat 1 in the front/rear direction and the up/down direction, and the tilt angle of the seatback 3 relative to the seat cushion 2.

Figure 2:
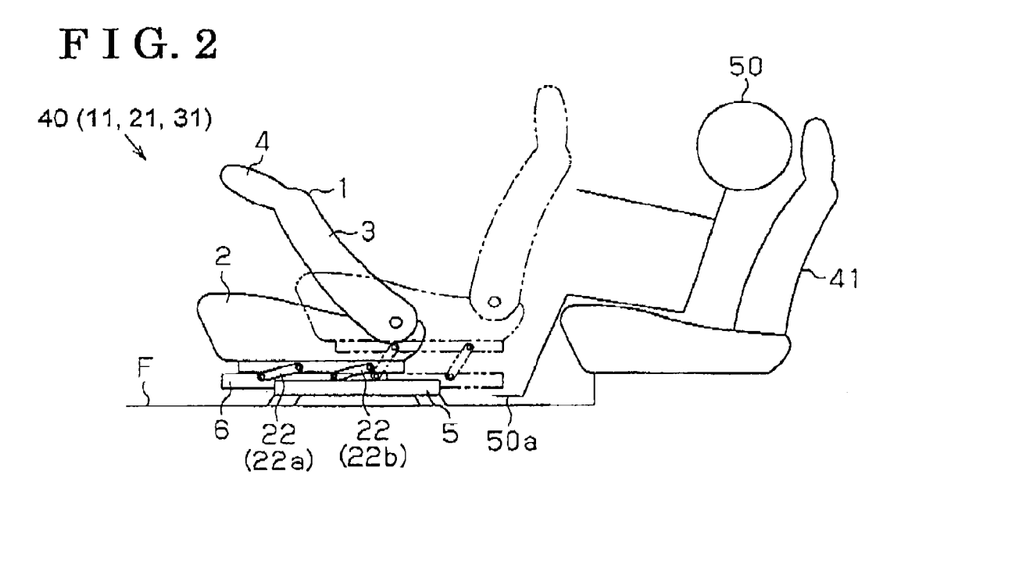
FIG. 2 is a diagram for explaining a walk-in function implemented at the seat apparatus.

For example, as illustrated in FIG. 2, the so-called walk-in function is implemented in the seat apparatus 40 of the present embodiment. The walk-in function is for associating or linking a forward movement of the seat 1 which is performed by the seat slide apparatus 11 and a forward tilting operation of the seatback 3 which is performed by the largely-tilting mechanism 33 of the seat reclining apparatus 31 with each other. In the present embodiment, an ease of ingress to and egress from a rear seat 41 which is arranged at a rear side relative to the seat 1 is enhanced by the walk-in function.

Specifically, as illustrated in FIG. 1, an operation lever 42 is provided at the seat 1 of the present embodiment. The operation lever 42 is arranged in a vicinity of an upper end of the seatback 3 (that is, a vicinity of a shoulder of the seatback 3) for operating the largely-tilting mechanism 33 of the seat reclining apparatus 31. In the present embodiment, the operation lever 42 and the largely-tilting mechanism 33 are connected to each other via a wire cable. The largely-tilting mechanism 33 is operated in response to the operation inputted to the operation lever 42, and thus the connection between the seat cushion 2 and the seatback 3 via the recliner 32 is released.

Figure 3:
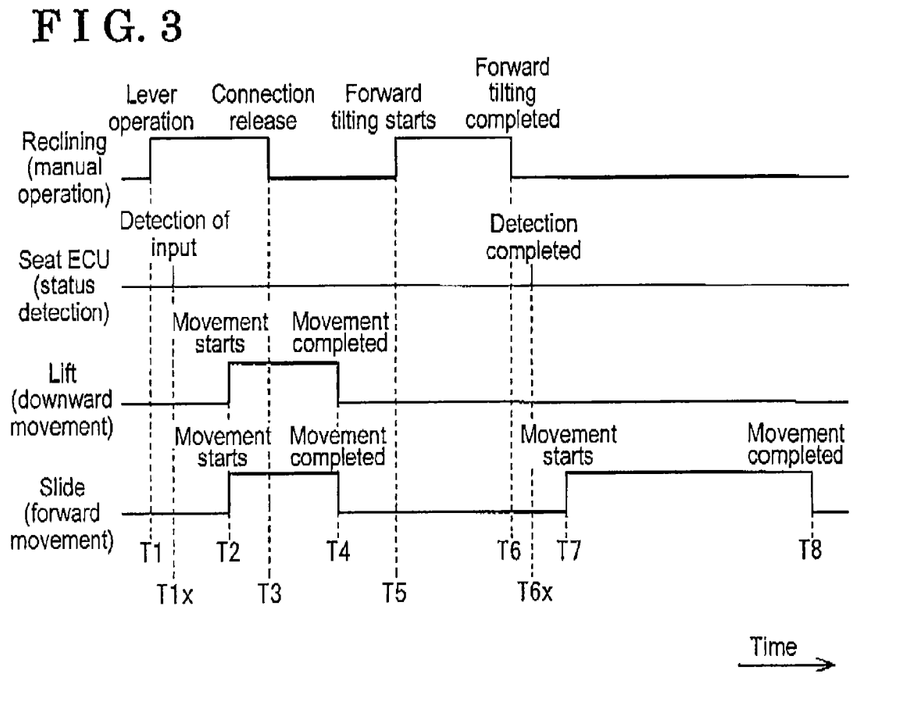
FIG. 3 is a time chart showing states of a walk-in operation according to the embodiment.

As illustrated in FIG. 3, according to the seat apparatus 40 of the present embodiment, in a case where the operation lever 42 is operated, the downward movement of the seat 1 which is performed by the seat lift apparatus 21 is started before the forward tilting operation of the seatback 3, which is the manual operation, is performed. Thus, according to the present embodiment, a possibility that an upper end portion of the seat 1 (the head rest 4) interferes with a roof of a vehicle may be reduced at a walk-in operation (refer to FIG. 6).

Specifically, as illustrated in FIG. 1, the seatback 3 of the present embodiment includes a first detector 45 and a second detector 46. The first detector 45 detects the operation of the largely-tilting mechanism 33. The second detector 46 is configured to detect the forward-tilting operation of the seatback 3, more specifically, the second detector 46 is configured to detect that the forward-tilting operation of the seatback 3 is completed and that the seatback 3 is raised up and thus the seatback 3 returns to a basic position thereof. In the present embodiment, a known limit switch is used at each of the first and second detectors 45, 46. The second detector 46 is configured so that the limit switch is turned "ON" by the completion of the forward tilting operation and that the limit switch is turned "OFF" by the return of the seatback 3 to the basic position thereof due to the raising of the seatback 3. The seat ECU 20 serving as a control device starts the forward movement of the seat 1 which is performed by the seat slide apparatus 11 and the downward movement of the seat 1 which is performed by the seat lift apparatus 21, on the basis of an output signal of each of the first and second detectors 45, 46.

More specifically, as illustrated in FIG. 3, in a case where the operation lever 42 is operated (a time T1), and then the operation of the largely-tilting mechanism 33, that is, the input operation to the operation lever 42, is detected by the first detector 45 (a time T1x), the seat ECU 20 of the present embodiment starts control (that is, downward movement control) of the seat lift apparatus 21 in order to move the seat 1 downwardly (a time T2).

In the present embodiment, when the seat lift apparatus 21 moves the seat 1 (the seat cushion 2) downward, the seat lift apparatus 21 moves the seat 1 also rearward because of the structural feature of the link mechanism 22 of the seat lift apparatus 21, that is, the downward movement of the seat 1 by the link mechanism 22 involves the rearward movement of the seat 1 by the link mechanism 22. In consideration of this aspect, at the same time as when the seat lift apparatus 21 starts moving the seat 1 downward, the seat ECU 20 of the present embodiment starts control (that is, forward movement control) on the seat slide apparatus 11 so that the seat 1 is moved forward (the time T2). As a result, according to the present embodiment, a possibility that a tow portion 50a of an occupant 50 who is seated in the rear seat 41 is caught between the floor portion F of the vehicle and the seat cushion 2 may be reduced.

According to the present embodiment, a timing at which the connection between the seat cushion 2 and the seatback 3 via the recliner 32 is released by the operation of the largely-tilting mechanism 33 (a time T3) is set to be earlier than the completion of the downward movement control on the downward movement of the seat 1 which is performed by the seat lift apparatus 21 (a time T4). In addition, the control on the forward movement of the seat 1 which is performed by the seat slide apparatus 11 at the same time as the downward movement of the seat 1 is completed at the same time as the completion of the downward movement control of the seat 1 (the time T4). In a case where the forward tilting operation, by manual, of the seatback 3 is started (a time T5) and the completion of the forward tilting operation (a time T6) is detected by the second detector 46 (a time T6x), the seat ECU 20 of the present embodiment executes the control on the forward movement of the seat 1, which constitutes or makes up the walk-in operation (a start time T7, a completion time T8).

Figure 4:
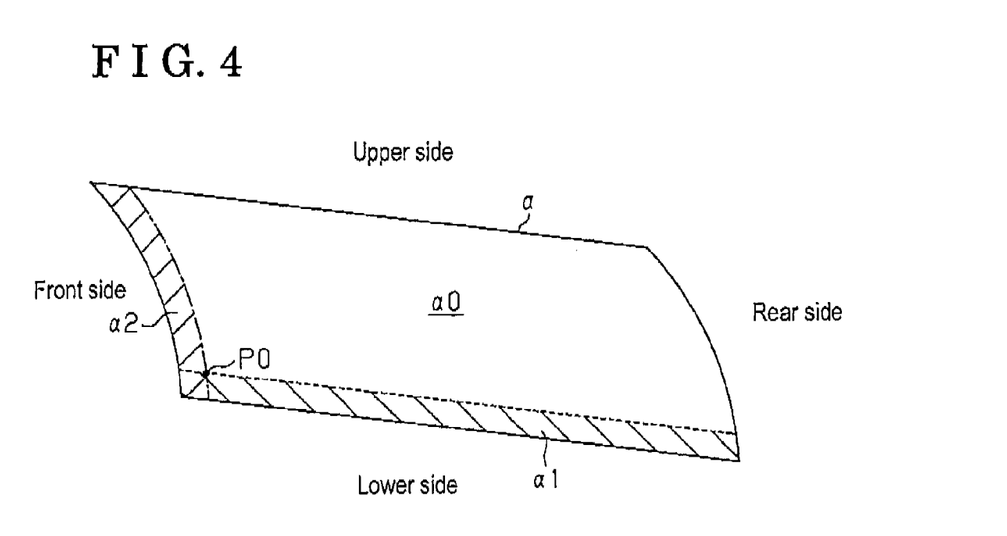
FIG. 4 is an explanatory diagram illustrating a downward movement restricted range and a forward movement restricted range which are specified at the seat apparatus.

As illustrated in FIG. 4, a downward movement restricted range α1 and a forward movement restricted range α2 are specified at the seat apparatus 40 of the present embodiment. In the downward movement restricted range α1, the downward movement of the seat 1 which is performed prior to the forward tilting operation of the seatback 3 is not performed. In the forward movement restricted range α2, the forward movement of the seat 1 which constitutes the walk-in operation is not performed.

Specifically, a range α that is surrounded with the solid lines in FIG. 4 indicates a range of a trajectory or a path drawn by the upper end portion of the seat 1 (the head rest 4) during the walk-in operation. In the range α, a lower portion which is defined with the dotted line corresponds to the downward movement restricted range α1. In the range α, a front portion which is defined with the one-dot-chain line corresponds to the forward movement restricted range α2.

That is, according to the seat apparatus 40 of the present embodiment, only in a case where a seat position of the seat 1 is not either in the downward movement restricted range α1 or in the forward movement restricted range α2 (that is, only in a case where the seat position is in a normal range α0), the downward movement of the seat 1 which precedes the forward tilting operation of the seatback 3 and the forward movement of the seat 1 which is performed after the forward tilting operation of the seatback 3 are performed as illustrated in FIG. 3. In a case where the seat position is already in the downward movement restricted range α1 before the walk-in operation, only the forward movement of the seat 1 is performed. In a case where the seat position is already in the forward movement restricted range α2 before the walk-in operation, only the downward movement of the seat 1 is performed.

In a case where the seat position of the seat 1 is in the downward movement restricted range α1 and the forward movement restricted range α2 before the walk-in operation, neither the downward movement of the seat 1 nor the forward movement of the seat 1 is performed. In a case where the seat position is in the normal range α0 before the walk-in operation, the seat position is moved, due to the walk-in operation, to a walk-in position P0 which is set at the lowest and the forefront side within the normal range α0.

Figure 5:
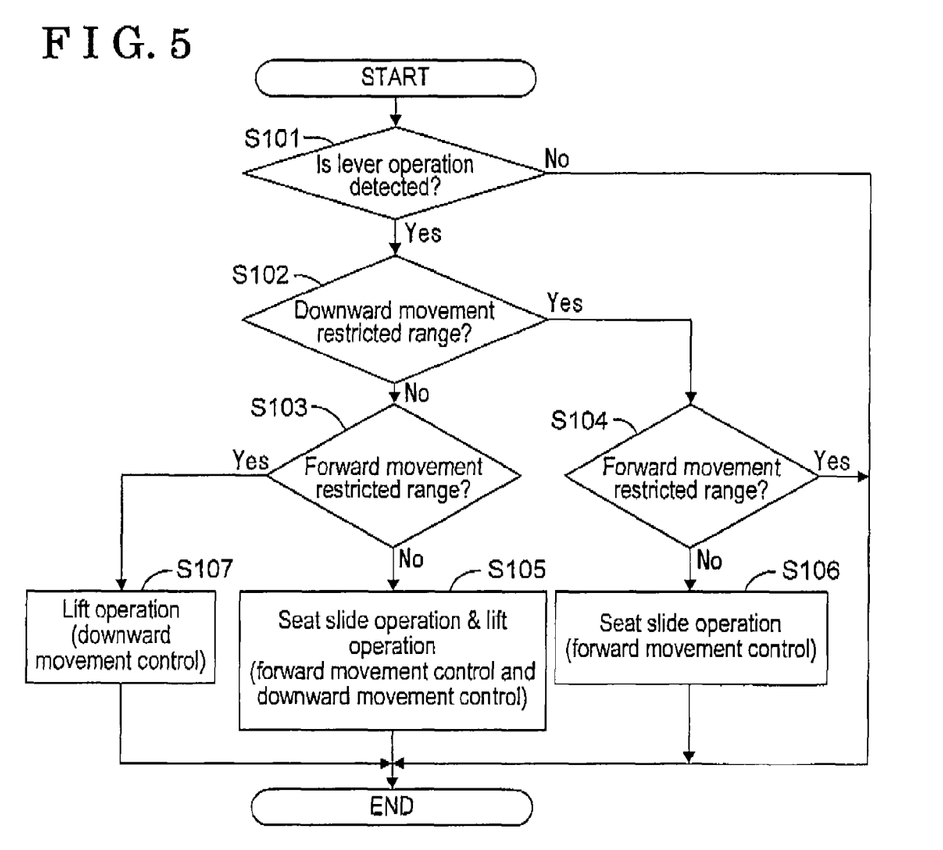
FIG. 5 is a flowchart showing procedures of a walk-in control according to the embodiment.

Next, procedures of a walk-in control according to the present embodiment will be described. As illustrated in the flowchart of FIG. 5, at the seat apparatus 40 of the present embodiment, in a case where the seat ECU 20 detects that the operation is inputted to the operation lever 42 (Step S101), the seat ECU 20 determines whether or not the seat position of the seat 1 is already in the downward movement restricted range α1 (Step S102) and whether or not the seat position is already in the forward movement restricted range α2 (Steps S103 and S104). Then, in a case where the seat position is not either in the downward movement restricted range α1 or in the forward movement restricted range α2 (NO in Step S102 and NO in Step S103), the seat ECU 20 controls the operations of the seat lift apparatus 21 and the seat slide apparatus 11 so that the downward movement of the seat 1 which precedes the forward tilting operation of the seatback 3 is performed and so that the forward movement of the seat 1 after the downward movement (and the forward movement of the seat 1 which is performed at the same time as the downward movement) is performed (Step S105).

On the other hand, in a case where the seat position of the seat 1 is in the downward movement restricted range α1 (YES in Step S102 and NO in Step S104), the seat ECU 20 does not execute the control on the downward movement of the seat 1 which precedes the forward tilting operation of the seatback 3, and the ECU 20 executes the forward movement control of the seat 1 which is performed after the forward tilting operation (Step S106). In a case where the seat position of the seat 1 is in the forward movement restricted range α2 (NO in Step S102 and YES in Step S103), the seat ECU 20 executes only the control on the downward movement of the seat 1 which precedes the forward tilting operation of the seatback 3 and the seat ECU 20 does not execute the control on the forward movement of the seat 1 which is to be performed after the downward movement (and the forward movement of the seat 1 which is to be performed at the same time as the downward movement) (Step S107). In a case where the seat position of the seat 1 is in the downward movement restricted range α1 and in the forward movement restricted range α2 (YES in Step S102 and YES in Step S104), the seat ECU 20 does not execute any of the control on the downward movement of the seat 1 which precedes the forward tilting operation of the seatback 3 or the control on the forward movement of the seat 1 which is to be performed after the downward movement (and the forward movement of the seat 1 which is to be performed at the same time as the downward movement).

As described above, according to the present embodiment, the following effects and advantages are obtained. (1) The seat apparatus 40 includes the seat slide apparatus 11 which adjusts the position of the seat 1 in the front/rear direction and serving as the first adjustment portion, the seat lift apparatus 21 which adjusts the position of the seat 1 in the up/down direction and serving as the second adjustment portion, and the seat reclining apparatus 31 which adjusts the tilt angle of the seatback 3 relative to the seat cushion 2 and serving as the third adjustment portion. In addition, the seat apparatus 40 includes the operation lever 42 which is operated so that the forward movement of the seat 1, which is performed by the seat slide apparatus 11, and the forward tilting operation of the seatback 3, which is performed by the seat reclining apparatus 31, are performed in the associated manner with each other. The operation lever 42 serves as an operation input portion. According to the seat apparatus 40, after the operation lever 42 is operated, the downward movement of the seat 1 which is performed by the seat lift apparatus 21 is started before the forward tilting operation of the seatback 3 is performed.

According to the above-described configuration, the so-called walk-in function in which the forward movement of the seat 1 and the forward tilting operation of the seatback 3 are associated or linked with each other is realized. As a result, the ease of ingress to and egress from the rear seat 41 arranged at the rear side relative to the seat 1 is enhanced. In addition, the position of the seat 1 in the up/down direction is lowered in advance prior to the forward tilting operation of the seatback 3. As a result, at the walk-in operation, the possibility of the interference between the upper end portion of the seat 1 and the roof of the vehicle may be reduced effectively.

(2) The forward movement of the seat 1 which is performed by the seat slide apparatus 11 is performed at the same time as the downward movement of the seat 1 which is performed by the seat lift apparatus 21. As a result, a delay of the walk-in operation, which is caused by performing the downward movement of the seat 1 prior to the forward tilting operation of the seatback 3, is restricted from occurring.

(3) When the seat lift apparatus 21 moves the seat 1 (the seat cushion 2) downward, the seat lift apparatus 21 moves the seat 1 also rearward because of the structural feature of the link mechanism 22 of the seat lift apparatus 21. That is, in the configuration including the above-described seat lift apparatus 21, there is the possibility that the tow portion 50a of the occupant 50 who is seated in the rear seat 41 is caught between the floor portion F of the vehicle and the seat cushion 2 when the seat 1 is moved downward prior to the forward tilting operation of the seatback 3. However, by employing the configuration described in the above (2), the possibility that the tow portion 50a is caught between the floor portion F and the seat cushion 2 may be reduced.

(4) At the seat apparatus 40, the downward movement restricted range $\alpha 1$, where the downward movement of the seat 1 which precedes the forward tilting operation of the seatback 3 is not performed, is specified. Thus, at the downward movement of the seat 1 which precedes the forward tilting operation of the seatback 3, the possibility that the tow portion 50a of the occupant 50 who is seated in the rear seat 41 is caught between the floor portion F of the vehicle and the seat cushion 2 may be reduced.

(5) At the seat apparatus 40, the forward movement restricted range $\alpha 2$ is specified, where the forward movement of the seat 1 which constitutes the walk-in operation is not performed. Thus, a possibility that the upper end portion of the seat 1 interferes with any portion within the vehicle cabin due to an excessive forward movement of the seat 1 may be reduced.

The aforementioned embodiment may be changed or modified as follows. In the aforementioned embodiment, the control on the forward movement of the seat 1 which is performed by the seat slide apparatus 11 is started at the same time as the downward movement of the seat 1 which precedes the forward tilting operation of the seatback 3. This forward movement control of the seat 1 is completed at the same time as the completion of the downward movement control of the seat 1. Then, after the forward tilting operation of the seatback 3 is completed, the control on the forward movement of the seat 1, which constitutes the walk-in operation, is performed.

However, the forward movement control which constitutes the walk-in operation may be performed in a continuous manner relative to the forward movement control of the seat 1 which is performed at the same time as the downward movement control of the seat 1. The forward movement of the seat 1 which constitutes the walk-in operation may start before the completion of the downward movement control of the seat 1.

In addition, the seat apparatus 40 may be configured in a manner that the forward tilting operation of the seatback 3 by the reclining apparatus 31 is executable before the completion of the downward movement of the seat 1 which is performed by the seat lift apparatus 21. The seat apparatus 40 may be configured in a manner that the forward tilting operation of the seatback 3 by the reclining apparatus 31 is inhibited from being performed until the downward movement of the seat 1 is completed.

In the aforementioned embodiment, the seat slide apparatus 11 constitutes the first adjustment portion which adjusts the position of the seat 1 in the front/rear direction and the seat lift apparatus 21 constitutes the second adjustment portion which adjusts the position of the seat 1 in the up/down direction. However, the first adjustment portion and the second adjustment portion are not limited thereto and may be constituted by other configurations. For example, either one of the first adjustment portion and the second adjustment portion, or both of the first adjustment portion and the second adjustment portion may be constituted by a tilt apparatus for tilting the seat 1 (the seat cushion 2).

In the aforementioned embodiment, the largely-tilting mechanism 33 of the seat reclining apparatus 31 which is configured to perform the forward tilting operation of the seatback 3 is the manually-operated type, however, the largely-tilting mechanism 33 may be an electrically-operated type.

In the aforementioned embodiment, each of the seat slide apparatus 11, the seat lift apparatus 21 and the seat reclining apparatus 31 (a main body which actuates the recliner 32) is an electrically-operated type. However, at least any one of the seat slide apparatus 11, the seat lift apparatus 21 and the seat reclining apparatus 31 may be a manually-operated type.

For example, in a case where the seat slide apparatus 11 and the seat lift apparatus 21 are the manually-operated type apparatuses, the seat lift apparatus 21 releases the support of the seat cushion 2 in response to the input operation to the operation lever 42. That is, the seat 1 may be configured to move downwardly due to the gravity. In addition, the seat slide apparatus 11 may be configured in a manner that the seat 1 moves towards the vehicle front side on the basis of a biasing force of a biasing member (a coil spring, for example) in association with the forward tilting operation of the seatback 3. The forward tilting operation of the seatback 3 is inhibited until the downward movement of the seat 1, which is performed in response to the input operation to the operation lever 42, is completed, for example.

In the aforementioned embodiment, the known limit switch, is used at each of the first detector 45 for detecting the operation of the largely-tilting mechanism 33 and the second detector 46 for detecting the forward tilting operation of the seatback 3. However, the configurations of the first and second detectors 45, 46 may be arbitrarily changed.

Next, technical ideas that can be grasped from the aforementioned embodiments and effects obtained from the aforementioned embodiments will be described. (A) The seat apparatus 40 includes the downward movement restricted range α1 where the downward movement of the seat 1 which precedes the forward tilting operation of the seatback 3 is prevented from being performed. Consequently, when the seat 1 is moved downwardly prior to the forward tilting operation of the seatback 3, the possibility that the tow portion 50a of the occupant 50 who is seated in the rear seat 41 is caught between the floor portion F of the vehicle and the seat cushion 2 may be reduced.

(B) The seat apparatus 40 includes the forward movement restricted range α2 where the forward movement of the seat 1 is prevented from being performed, the forward movement being performed in a case where the operation lever 42 is operated. Consequently, the possibility that the upper end portion of the seat 1 interferes with any portion within the vehicle cabin due to the excessive forward movement of the seat 1 may be reduced.

(C) The forward tilting operation of the seatback 3 which is performed by the seat reclining apparatus 31 is performed after the completion of the downward movement of the seat 1 which is performed by the seat lift apparatus 21. Consequently, at the walk-in operation, the possibility that the upper end portion of the seat 1 interferes with the roof of the vehicle is reduced more effectively.

According to the aforementioned embodiment, the seat apparatus 40 for the vehicle includes the seat slide apparatus 11 which adjusts the position of the seat 1 in the front/rear direction, the seat lift apparatus 21 which adjusts the position of the seat 1 in the up/down direction, the seat reclining apparatus 31 which adjusts the tilt angle of the seatback 3 relative to the seat 1, and the operation lever 42 which is operated for performing the forward movement of the seat 1 and the forward tilting operation of the seatback 3 in the associated manner with each other, the forward movement of the seat 1 being performed by the seat slide apparatus 11 and the forward tilting operation of the seatback 3 being performed by the seat reclining apparatus 31, wherein the seat lift apparatus 21 starts performing the downward movement of the seat 1 before the forward tilting operation of the seatback 3 is performed after the operation of the operation lever 42.

According to the above-described configuration, the so-called walk-in function is realized in which the forward movement of the seat 1 and the forward tilting operation of the seatback 3 are associated or linked with each other. As a result, the ease of ingress to and egress from the rear seat 41 which is arranged at the rear side relative to the seat 1 is enhanced. In addition, the position of the seat 1 in the up/down direction is lowered in advance prior to the forward tilting operation of the seatback 3. As a result, at the walk-in operation, the possibility that the upper end portion of the seat 1 interferes with the roof of the vehicle may be reduced effectively.

According to the above-described configuration, the possibility of the interference of the seat 1 and the roof of the vehicle with each other is reduced.

According to the aforementioned embodiment, the forward movement of the seat 1 is performed by the seat slide apparatus 11 at the same time as when the downward movement of the seat 1 is performed by the seat lift apparatus 21.

According to the above-described configuration, the delay in the walk-in operation, which is caused by performing the downward movement of the seat 1 prior to the forward tilting operation of the seatback 3, is restricted from occurring.

According to the aforementioned embodiment, the seat lift apparatus 21 moves the seat 1 rearward when the seat lift apparatus 21 moves the seat 1 downward.

According to the above-described configuration including the aforementioned seat lift apparatus 21, there is the possibility that the tow portion 50a of the occupant 50 who is seated in the rear seat 41 is caught between the floor portion F of the vehicle and the seat 1 (the seat cushion 2) when the seat 1 is moved downward prior to the forward tilting operation. The aforementioned possibility that the tow portion 50a is caught between the floor portion F and the seat cushion 2 may be reduced by employing the forward movement of the seat 1, which is performed at the same time as the downward movement of the seat 1, to the above-described configuration.

According to the aforementioned embodiment, the seat apparatus 40 includes the downward movement restricted range α1 in which the downward movement of the seat 1 which precedes the forward tilting operation of the seatback 3 is prevented from being performed.

According to the above-described configuration, the possibility that the tow portion 50a of the occupant 50 who is seated in the rear seat 41 is caught between the floor portion F of the vehicle and the seat cushion 2 when the seat 1 is moved downwardly prior to the forward tilting operation of the seatback 3 may be reduced.

According to the aforementioned embodiment, the seat apparatus 40 includes the forward movement restricted range α2 in which the forward movement of the seat 1, which is performed in a case where the operation lever 42 is operated, is prevented from being performed.

According to the above-described configuration, the possibility that the upper end portion of the seat 1 interferes with any portion within the vehicle cabin due to the excessive forward movement of the seat 1 may be reduced.

According to the aforementioned embodiment, the forward tilting operation of the seatback 3 which is performed by the seat reclining apparatus 31 is performed after the completion of the downward movement of the seat 1 which is performed by the seat lift apparatus 21.

According to the above-described configuration, at the walk-in operation, the possibility that the upper end portion of the seat 1 interferes with the roof of the vehicle is reduced more effectively.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat apparatus for a vehicle, comprising:
a first adjustment portion which adjusts a position of a vehicle seat in a front/rear direction;
a second adjustment portion which adjusts a position of the vehicle seat in an up/down direction;
a third adjustment portion which adjusts a tilt angle of a seatback relative to the vehicle seat; and
an operation input portion which is operated for performing a forward movement of the vehicle seat and a forward tilting operation of the seatback in an associated manner with each other, the forward movement of the vehicle seat being performed by the first adjustment portion and the forward tilting operation of the seatback being performed by the third adjustment portion, wherein
the second adjustment portion starts performing a downward movement of the vehicle seat before the forward tilting operation of the seatback is performed after the operation of the operation input portion,
the forward movement of the vehicle seat is performed by the first adjustment portion at the same time as when the downward movement of the vehicle seat is performed by the second adjustment portion, and
the second adjustment portion moves the vehicle seat rearward when the second adjustment portion moves the vehicle seat downward.

2. The seat apparatus according to claim 1, further comprising:
a downward movement restricted range in which the downward movement of the vehicle seat which precedes the forward tilting operation of the seatback is prevented from being performed.

3. The seat apparatus according to claim 1, further comprising:
a forward movement restricted range in which the forward movement of the vehicle seat which is performed in a case where the operation input portion is operated is prevented from being performed.

4. The seat apparatus according to claim 1, wherein the forward tilting operation of the seatback which is performed by the third adjustment portion is performed after the completion of the downward movement of the vehicle seat which is performed by the second adjustment portion.

* * * * *